(12) United States Patent
Han

(10) Patent No.: US 9,397,889 B2
(45) Date of Patent: Jul. 19, 2016

(54) DISPLAY APPARATUS AND IMPLEMENTATION METHOD THEREOF

(75) Inventor: Kum-yon Han, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 370 days.

(21) Appl. No.: 13/487,674

(22) Filed: Jun. 4, 2012

(65) Prior Publication Data

US 2012/0311561 A1 Dec. 6, 2012

(30) Foreign Application Priority Data

Jun. 2, 2011 (KR) .................. 10-2011-0053231
Aug. 18, 2011 (KR) .................. 10-2011-0082150

(51) Int. Cl.
| G06F 9/445 | (2006.01) |
| H04L 12/24 | (2006.01) |
| H04N 21/458 | (2011.01) |
| H04N 21/81 | (2011.01) |

(52) U.S. Cl.
CPC ........ *H04L 41/0813* (2013.01); *H04N 21/4586* (2013.01); *H04N 21/8173* (2013.01)

(58) Field of Classification Search
CPC  H04N 21/00; H04L 41/0806; H04L 41/0813; H04L 12/2803
USPC .......... 709/203, 217, 232; 725/25, 28, 38–39, 725/87, 107, 61, 132; 717/140; 726/3; 340/10.6
See application file for complete search history.

(56) References Cited

U.S. PATENT DOCUMENTS

| 6,704,933 | B1 |   | 3/2004  | Tanaka et al. |
| 7,992,163 | B1 | * | 8/2011  | Jerding et al. .................. 725/28 |
| 2003/0229900 | A1 | * | 12/2003 | Reisman ......................... 725/87 |
| 2007/0233782 | A1 | * | 10/2007 | Tali ........................... G06F 8/61 709/203 |
| 2008/0077703 | A1 | * | 3/2008  | Lee .............................. 709/232 |
| 2008/0127255 | A1 | * | 5/2008  | Ress et al. ....................... 725/38 |
| 2009/0085724 | A1 | * | 4/2009  | Naressi et al. ............... 340/10.6 |
| 2010/0023865 | A1 | * | 1/2010  | Fulker ................ G06F 3/04817 715/734 |
| 2010/0161757 | A1 | * | 6/2010  | Suh et al. ...................... 709/217 |

(Continued)

FOREIGN PATENT DOCUMENTS

| JP | 2004-72129 A | 3/2004 |
| WO | 01/31442 A2 | 5/2001 |
| WO | 01/84320 A2 | 11/2001 |

OTHER PUBLICATIONS

Communication, dated Jul. 16, 2013, issued by the European Patent Office in counterpart European Application No. 12 162 504.0.
Communication, dated Oct. 17, 2012, issued by the European Patent Office in counterpart European Patent Application No. 12162504.0.
Communication dated May 20, 2014 issued by the European Patent Office in counterpart European Application No. 12 162 504.0.

(Continued)

*Primary Examiner* — Tuan Vu
(74) *Attorney, Agent, or Firm* — Sughrue Mion, PLLC

(57) ABSTRACT

A display apparatus includes: a communication unit which communicates with a service providing apparatus providing at least one service and an external server storing information used to implement the at least one service; and a controller which receives the information used to implement the at least one service corresponding to unique information about the service providing apparatus from the external server, installs the at least one service based on the received information used to implement the at least one service, and executes the installed at least one service in a preset condition when the unique information about the service providing apparatus is received through the communication unit.

34 Claims, 7 Drawing Sheets

(56) References Cited

U.S. PATENT DOCUMENTS

| | | | |
|---|---|---|---|
| 2010/0180169 A1* | 7/2010 | La Fever | G01R 31/318536 714/727 |
| 2010/0333138 A1* | 12/2010 | Klappert | 725/39 |
| 2011/0246567 A1* | 10/2011 | Cedervall et al. | 709/203 |
| 2011/0247031 A1* | 10/2011 | Jacoby | 725/25 |
| 2012/0180109 A1* | 7/2012 | Chen | 726/3 |

OTHER PUBLICATIONS

Communication dated Jan. 20, 2015 issued by the European Patent Office in counterpart European Patent Application No. 12162504.0.

Communication issued on May 19, 2015 by the European Patent Office in related Application No. 12162504.0.

* cited by examiner

FIG. 5

SERVICE 1

◇ APPLICATION 1: INFORMATION ABOUT DOWNLOAD LOCATION OR
SOURCE CODE OF APPLICATION 1

◇ APPLICATION 2: INFORMATION ABOUT DOWNLOAD LOCATION OR
SOURCE CODE OF APPLICATION 2

◇ APPLICATION 3: INFORMATION ABOUT DOWNLOAD LOCATION OR
SOURCE CODE OF APPLICATION 3

•
•
•

FIG. 6
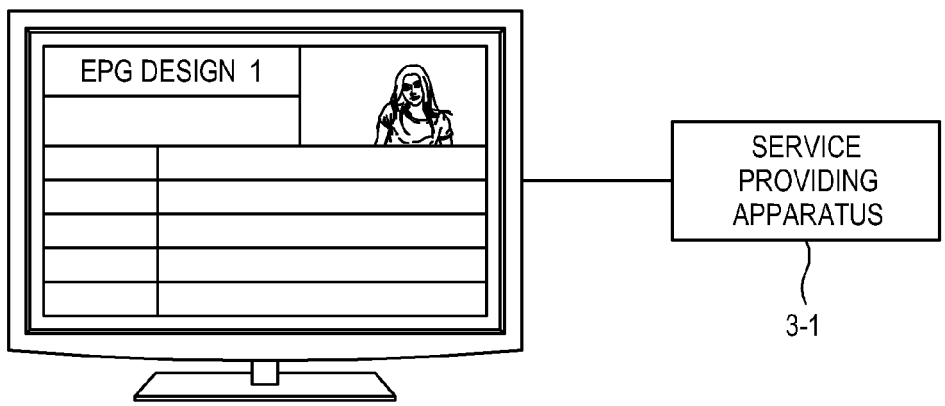
1-1 DISPLAY APPARATUS
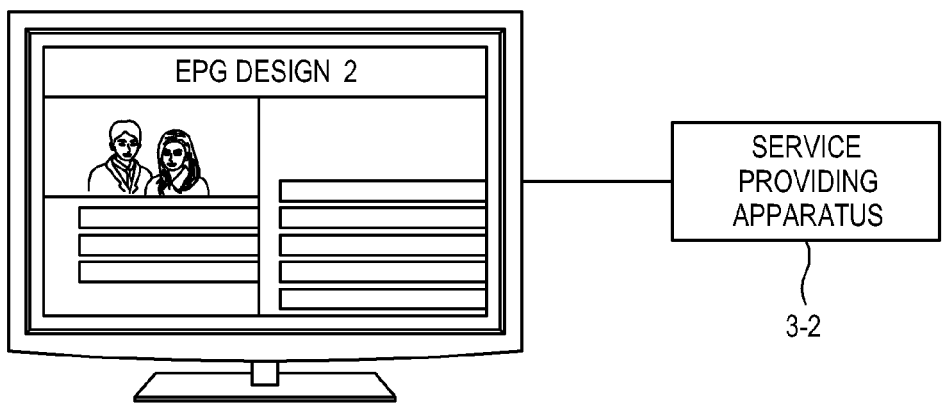
1-2 DISPLAY APPARATUS
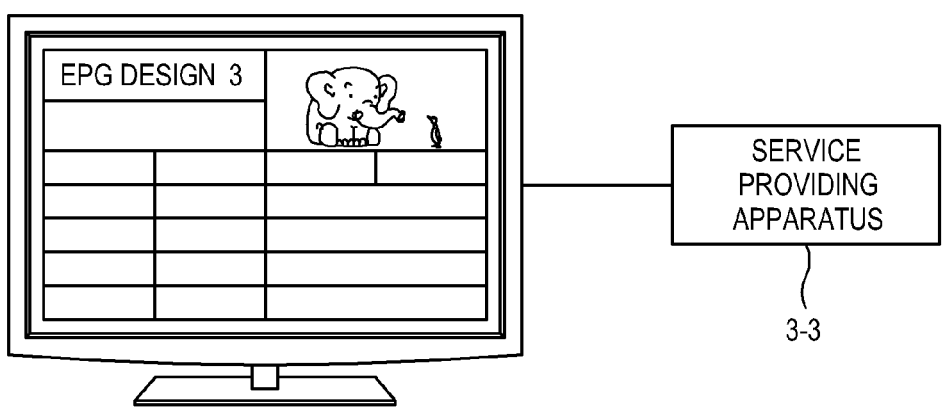
1-3 DISPLAY APPARATUS

DISPLAY APPARATUS AND IMPLEMENTATION METHOD THEREOF

CROSS-REFERENCE TO RELATED APPLICATION

This application claims priorities from Korean Patent Application Nos. 10-2011-0053231, filed on Jun. 2, 2011 and 10-2011-0082150, filed on Aug. 18, 2011 in the Korean Intellectual Property Office, the disclosures of which are incorporated herein by reference.

BACKGROUND

1. Field

Apparatuses and methods consistent with exemplary embodiments relate to a display apparatus and an implementation method thereby. More particularly, exemplary embodiments relate to a display apparatus which automatically installs or deletes an application, and an implementation method thereby.

2. Description of the Related Art

A service providing apparatus providing a service is connected to a display apparatus, thereby providing the service to the display apparatus. Recently, as various services are provided to the display apparatus in the form of applications, the service providing apparatus may also provide a service in an application form. According to a related art, the applications are generally downloaded from an application store by a user selection and installed. The application store has a tremendous number of applications, and it is inconvenient for the user to search, download, and execute an application performing a particular service one by one in the application store in order to use the particular service.

Further, the particular service provided by the service providing apparatus may be displayed to the user using a user-interface (UI) or may receive the user selection using the UI. Since the UI is specific to the service providing apparatus (or the service provider), the display apparatus generates UI through firmware for the particular service providing apparatus (or the service provider). Therefore, the related art involves a problem in that firmware needs to be developed by each service providing apparatus (or the service provider).

SUMMARY

Accordingly, one or more exemplary embodiments provide a display apparatus which automatically downloads, installs, and executes an application related to a particular service or automatically deletes a pre-installed application not related to the particular service, and an implementation method thereby.

Further, one or more exemplary embodiments provide a display apparatus which automatically installs and executes a UI providing unit providing UI specific to a particular service providing apparatus, and an implementation method thereby.

According to an aspect of an exemplary embodiment, there is provided a display apparatus including: a communication unit which communicates with a service providing apparatus providing at least one service and an external server storing information used to implement the at least one service; and a controller which receives the information used to implement the at least one service corresponding to unique information about the service providing apparatus from the external server, installs the at least one service based on the received information used to implement the at least one service, and executes the installed at least one service in a preset condition when the unique information about the service providing apparatus is received through the communication unit.

Implementing the at least one service comprises an application implementing a corresponding service, and the controller may receive information about at least one application from the external server and installs and executes the at least one application based on the information about the at least one application.

The controller may automatically execute an application corresponding to a preset signal among the installed at least one application when the preset signal is received.

The display apparatus may further include a storage unit storing information about an application that is pre-installed in the display apparatus.

The controller may compare the received information about the at least one application corresponding to the unique information about the service providing apparatus with the information about the stored pre-installed application, and then deletes a pre-installed application which is not included in the received information about the at least one application corresponding to the unique information about the service providing apparatus.

The controller may update the information about the application pre-installed in the storage unit corresponding to the installation or the deletion of the application.

The unique information about the service providing apparatus may include at least one of an identification number of the service providing apparatus and information about a particular service provided by the service providing apparatus.

The information about the at least one application may include at least one of information about a list of at least one application related to a particular service based on the unique information about the service providing apparatus, information about a download location of the at least one application included in the information about the list, and information about a source code of the at least one application included in the information about the list.

Implementing the at least one service may include an user interface (UI) specific to the service providing apparatus, and the controller may receive information about the UI corresponding to the service providing apparatus from the external server and installs and executes an UI providing unit providing the UI corresponding to the service providing apparatus based on the information about the UI.

The information about the UI may include at least one of information about a source code needed to install the UI providing unit and information about a download location of information about a source code.

Another aspect may be achieved by providing an implementation method by a display apparatus including: receiving unique information about a service providing apparatus from the service providing apparatus connected to the display apparatus; receiving information used to implement at least one service corresponding to the received unique information about the service providing apparatus from an external server; installing the at least one service based on the received information used to implement the at least one service; and executing the installed at least one service in a preset condition.

Implementing the at least one service may include an application implementing a corresponding service, receiving information about at least one application corresponding to the unique information about the service providing apparatus, and installing and executing the at least one application based on the information about the at least one application.

The executing the at least one application may be automatically executing an application corresponding to a preset signal among the installed at least one application when the preset signal is received.

The implementation method may further include storing, in a storage unit, information about an application pre-installed in the display apparatus.

The installing the application may further include comparing the received information about the at least one application corresponding to the unique information about the service providing apparatus with the information about the stored pre-installed application, and then deleting a pre-installed application which is not included in the received information about the at least one application corresponding to the unique information about the service providing apparatus.

The implementation method may further include updating the information about the application pre-installed in the storage unit corresponding to the installation or the deletion of the application.

The unique information about the service providing apparatus may include at least one of an identification number of the service providing apparatus and information about a particular service provided by the service providing apparatus.

The information about the at least one application may include at least one of information about a list of at least one application related to a particular service based on the unique information about the service providing apparatus, information about a download location of the at least one application included in the information about the list, and information about a source code of the at least one application included in the information about the list.

Implementing the at least one service may include an user interface (UI) specific to the service providing apparatus, receiving information about the UI corresponding to the unique information about the service providing apparatus, installing and executing an UI providing unit providing the UI corresponding to the service providing apparatus based on the received information about the UI.

The information about the UI may include at least one of information about a source code needed to install the UI providing unit and information about a download location of information about the source code.

Still another aspect may be achieved by providing a display apparatus including: a communication unit which communicates with an external server storing information about a plurality of applications; and a controller which transmits information about one service among a plurality of services to the external server through the communication unit, receives information about at least one application corresponding to the transmitted information about the service, installs the at least one application based on the received information about the at least one application, and executes the installed at least one application in a preset condition.

The display apparatus may further include a user input unit through which a user inputs a selection of the one service among the plurality of services, and the controller may transmit information about the service selected by the user to the external server.

The controller may automatically execute an application corresponding to a preset signal among the installed at least one application when the preset signal is received.

The display apparatus may further include a storage unit which stores information about an application that is pre-installed in the display apparatus.

The controller may compare the received information about the at least one application corresponding to unique information about the service providing apparatus with the information about the stored pre-installed application, and then delete a pre-installed application which is not included in the received information about the at least one application corresponding to the unique information about the service providing apparatus.

The controller may update the information about the application pre-installed in the storage unit corresponding to the installation or the deletion of the application.

The information about the at least one application may include at least one of information about a list of at least one application related to the one service based information about the one service selected by an user, information about a download location of the at least one application included in the information about the list, and information about a source code of the at least one application included in the information about the list.

Still another aspect may be achieved by providing an implementation method by a display apparatus including: receiving information about at least one application corresponding to information about one service among a plurality of services from an external server; installing the at least one application based on the information about the at least one application; and executing the installed at least one application in a preset condition.

The implementation method may further include: receiving an user selection of the one service among the plurality of services; and transmitting information about the one service selected by the user to the external server.

The executing the installed at least one application may automatically execute an application corresponding to a preset signal among the installed at least one application when the preset signal is received.

The implementation method may further include storing, in a storage unit, information about an application pre-installed in the display apparatus.

The installing the application may further include comparing the received information about the at least one application corresponding to unique information about the service providing apparatus with the information about the stored pre-installed application, and then deleting a pre-installed application which is not included in the received information about the at least one application corresponding to the unique information about the service providing apparatus.

The implementation method may further include updating the information about the application pre-installed in the storage unit corresponding to the installation or the deletion of the application.

The information about the at least one application may include at least one of information about a list of at least one application related to the one service based on information about the one service selected by an user, information about a download location of the at least one application included in the information about the list, and information about a source code of the at least one application included in the information about the list.

Still another aspect may be achieved by providing a display apparatus system including: a first communication unit of a display apparatus which communicates with a service providing apparatus providing at least one service and an external storage, the first communication unit receives unique information about the service providing apparatus from the service providing apparatus and transmits the unique information about the service providing apparatus to the external storage; a second communication unit of the external storage which receives the unique information about the service providing apparatus from the first communication unit and transmits information used to implement the at least one service corresponding to the unique information about the service providing apparatus to the first communication unit; a first controller which receives the information used to implement the at least one service corresponding to the unique information about the service providing apparatus from the first communication unit, installs the at least one service based on the received information used to implement the at least one service, and executes the installed at least one service in a preset condition when the unique information about the service is received through the first communication unit; and a second controller which receives the unique information about the service providing apparatus from the second communication unit and transmits to the second communication unit the information used to implement the at least one service corresponding to the unique information about the service providing apparatus.

As described above, exemplary embodiments provide a display apparatus which automatically installs and executes an application performing a particular service or automatically deletes an application not related to the particular service, and an implementation method thereby.

BRIEF DESCRIPTION OF THE DRAWINGS

The above and/or other aspects will become apparent and more readily appreciated from the following description of the exemplary embodiments, taken in conjunction with the accompanying drawings, in which:

FIG. 5 illustrates an example of storing by a storage unit of the display apparatus according to the exemplary embodiment.

FIG. 6 illustrates an example of a user interface (UI) provided by a UI providing unit of the display apparatus according to the exemplary embodiment.

DETAILED DESCRIPTION OF EXEMPLARY EMBODIMENTS

Figure 1:
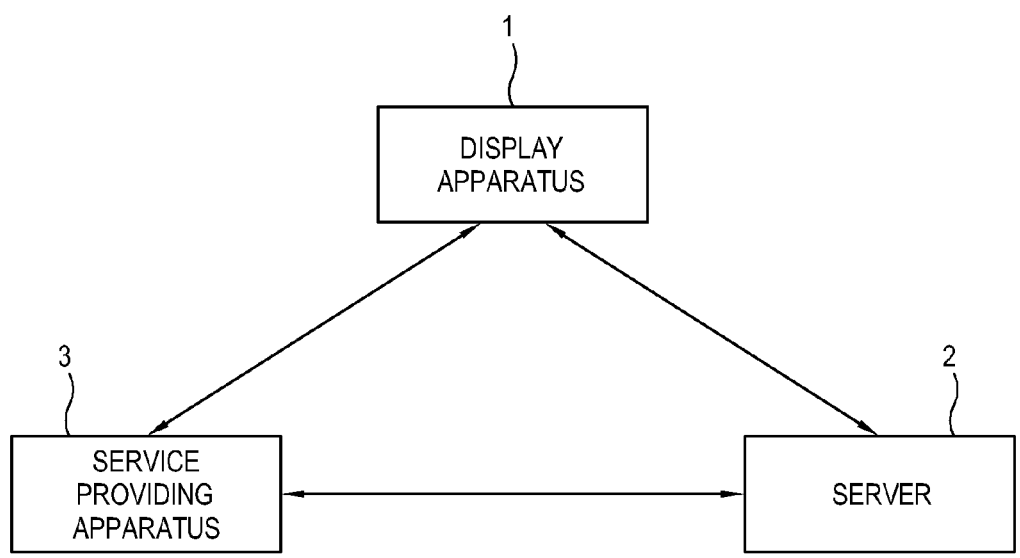
FIG. 1 is a schematic view of a system including a display apparatus according to an exemplary embodiment.

Below, exemplary embodiments will be described in detail with reference to accompanying drawings so as to be easily realized by a person having ordinary knowledge in the art. The exemplary embodiments may be embodied in various forms without being limited to the exemplary embodiments set forth herein. Descriptions of well-known parts are omitted for clarity and conciseness, and like reference numerals refer to like elements throughout.

FIG. 1 is a schematic view of a system including a display apparatus according to an exemplary embodiment.

As shown in FIG. 1, the system includes a display apparatus 1, a service providing apparatus 3, and an external server 2. The display apparatus 1 is connected to the service providing apparatus 3 and the external server 2 through a communication unit and the display apparatus 1 transmits/receives various control signals and data through the communication unit.

The display apparatus 1 according to the exemplary embodiment receives unique information about the service providing apparatus 3 from the service providing apparatus 3 to transmit to the external server 2 and receives information about at least one service implementation means corresponding to the unique information about the service providing apparatus from the external server 2. The display apparatus 1 installs the at least one service implementation means based on the received information about at least one service implementation means and executes the installed at least one service implementation means in a preset condition. The service implementation means includes an application to implement a particular service function or a UI specific to a particular service.

Alternatively, the display apparatus 1 may delete the service implementation means previously installed in the display apparatus 1 based on the received information about at least one service implementation means.

A display apparatus 1 according to another exemplary embodiment transmits information about any one service selected by a user among a plurality of services to the external server 2 and receives information about at least one application corresponding to the service selected by the user from the server 2. The display apparatus 1 downloads and installs the application based on the received information about at least one application and executes the installed application in a preset condition. Alternatively, the display apparatus 1 may delete a previously installed application based on the received information about at least one application.

The display apparatus 1 may be configured as a television (TV) which installs and executes a service implementation means. The service implementation means may include an application to implement a function or the UI specific to the service providing apparatus to provide a service corresponding to the service implementation means. When the display apparatus 1 is realized by a television, the display apparatus 1 may include a digital TV or an Internet Protocol television (IPTV) connected to the external server 2 using internet protocols The display apparatus 1 may also include a smart phone, a personal computer (PC), a netbook, a tablet PC, and a personal media player (PMP) that installs and executes a service implementation means including an application to implement a service function or the UI specific to the service providing apparatus. The application refers to a program installed in an electronic device and performs a preset function. In the present embodiment, the application is not particularly limited to kinds and functions.

The external server 2 provides information about at least one service implementation means corresponding to the unique information about the service providing apparatus 3 received from the display apparatus 1. The external server 2 includes a communication unit 210 communicating with the display apparatus 1, a storage unit 220 storing information about at least one service implementation means, and a controller 230 processing data and supervising communication with the display apparatus 1.

The service providing apparatus 3 is an electronic device which is connected to the display apparatus 1 and provides a service. For example, the service providing apparatus 3 may include a device which is capable of performing services of providing various formats of broadcasts, i.e., cable broadcasts, digital broadcasts, or IPTV broadcasts, services provided through the internet, services provided by an internet phone, services of providing entertainment, i.e., movies, music, games, and shopping. The service providing apparatus 3 provides a different service depending on a service provider.

Figure 2:
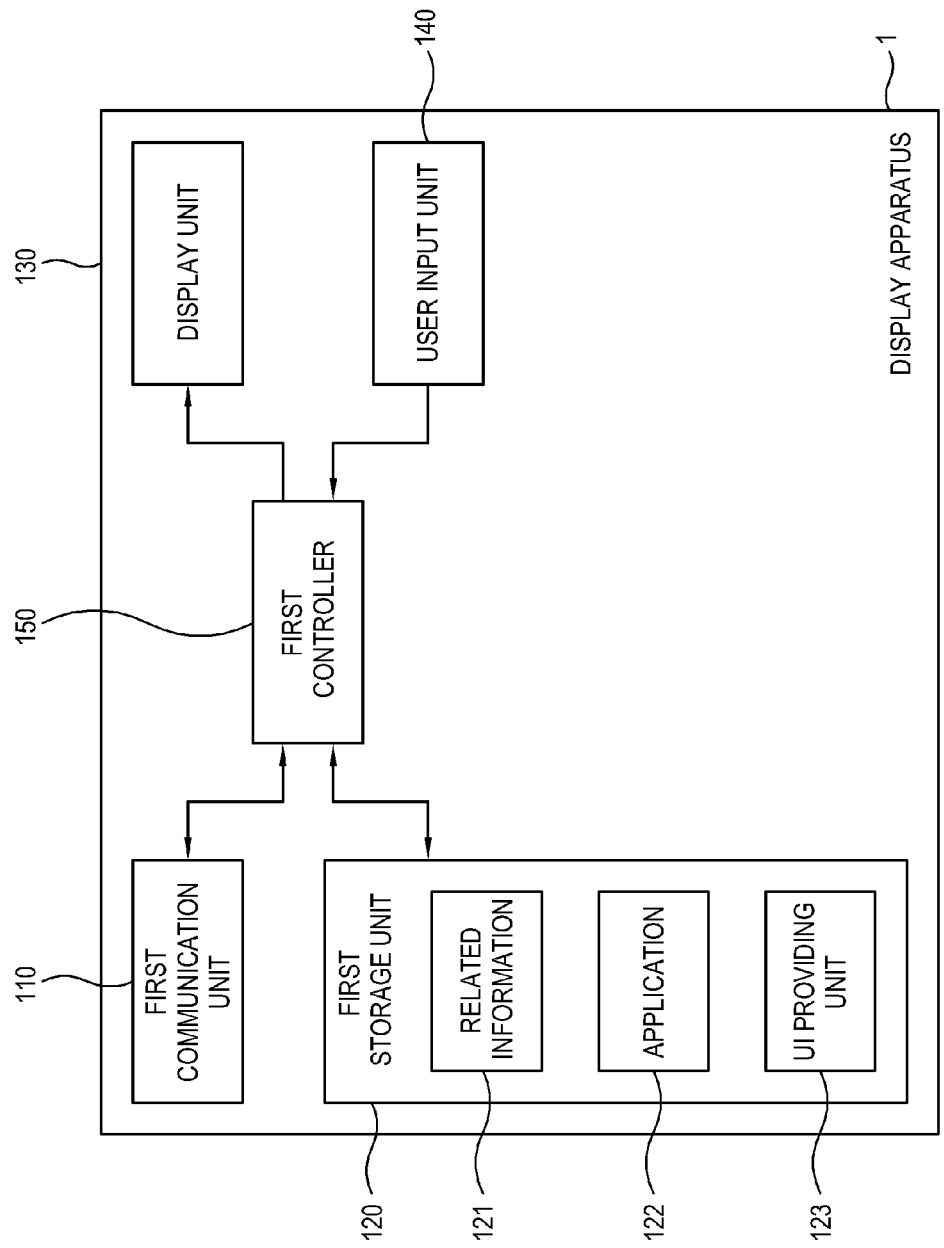
FIG. 2 is a block diagram of the display apparatus according to the exemplary embodiment.
Figure 3:
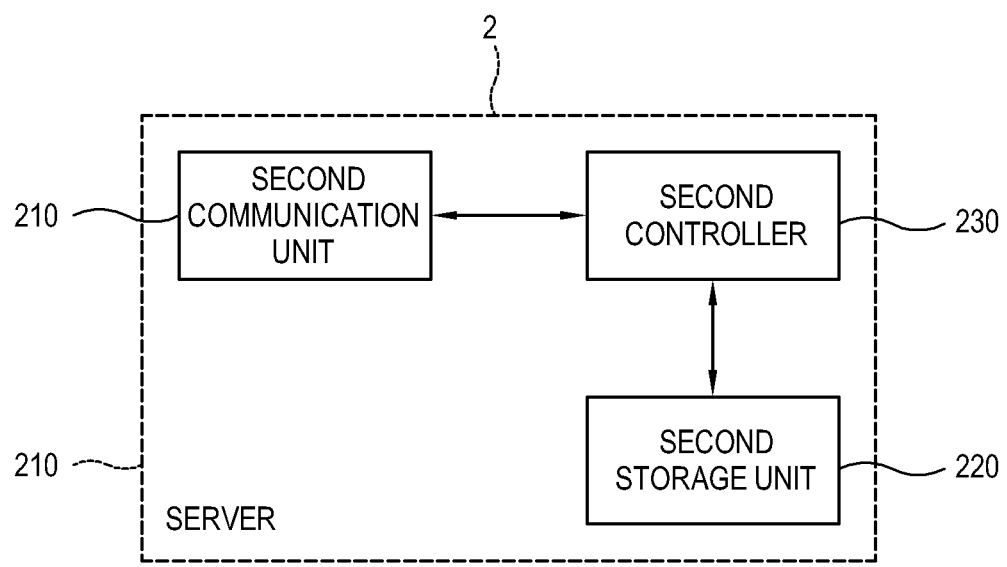
FIG. 3 is a block diagram of a server according to the exemplary embodiment.

Hereinafter, the display apparatus 1 and the external server 2 are described in detail with reference to FIG. 2 and FIG. 3. FIG. 2 illustrates the block diagram of the display apparatus 1. FIG. 3 illustrates the block diagram of the external server 2.

Referring to FIG. 2, the display apparatus 1 includes a first communication unit 110, a first storage unit 120, a display unit 130, a user input unit 140, and a first controller 150. Referring to FIG. 3, the external server 2 includes a second communication unit 210, a second storage unit 220, and a second controller 230.

The first communication unit 110 may communicate with the second communication unit 210 of the server 2 and the service providing apparatus 3. In one embodiment, the first communication unit 110 receives the unique information about the service providing apparatus 3 from the service providing apparatus 3, transmits the unique information to the server 2, and receives information about at least one service implementation means corresponding to the unique information about the service providing apparatus 3 from the server 2. The unique information about the service providing apparatus 3 may include at least one of an identification number of the service providing apparatus 3 and information about a particular service provided by the service providing apparatus 3. The service implementation means includes an application to implement a particular function in connection with a service and/or a UI specific to the service providing apparatus 3. Thus, the information about the service implementation means includes information about the application and/or information about the UI. The information about the application includes at least any one of information about a list of at least one application related to the particular service based on the unique information about the service providing apparatus, information about a download location of the at least one application included in the information about the list (e.g., uniform resource locator, URL address), and information about a source code of the at least one application included in the information about the list. Further, the information about the UI includes at least any one of information about a source code needed to install a UI providing unit providing UI corresponding to the service providing apparatus 3 and information about a download location of the information about the source code (e.g., the URL address).

Alternatively, the first communication unit 110 transmits information about any one service among a plurality of services to the second communication unit 210 of the server and receives information about at least one application corresponding to the transmitted information about the service from the server 2. The information about the application includes at least one of information about a list of at least one application related to the service based on the transmitted information about the service, information about a download location of the at least one application included in the information about the list (e.g., URL address), and information about a source code of the at least one application included in the information about the list.

The first storage unit 120 may store the unique information about the service providing apparatus 3 received through the first communication unit 110. Further, the first storage unit 120 may store related information 121, an application 122, and a UI providing unit 123.

The related information 121 includes information about at least one service implementation means previously installed in the display apparatus 1 and a list of the related information (See FIG. 5). As shown in FIG. 5, the related information 121 may include information about at least one application previously installed the display apparatus 1 and a list of the information about the application or may include information about the UI providing unit 123 previously installed in the display apparatus 1 and a list thereof.

The application 122 includes at least one application 122 to perform a particular function. When an application is downloaded based on the information about the application by control of the controller 150, the application 122 may store the downloaded application.

The UI providing unit 123 provides the UI specific to the service providing apparatus 3. The UI providing unit 123 may store the UI providing unit downloaded or installed based on the information about the UI by control of the controller 150.

The display apparatus 1 receives an image signal from a reception unit (not shown) and processes the image signal through a signal processor (not shown) to display on the display unit 130. Thus, the display unit 130 may display an image corresponding to the image signal processed by the signal processor. Moreover, the display unit 130 may display an icon (not shown) representing an application installed in the display apparatus 1. In addition, an application may be displayed on the display unit 130 as to whether the application is executed or an execution process, depending on functions thereof. The display unit 130 may be configured, without being particularly limited, in various display types, i.e., liquid crystals, plasma, light-emitting diodes, organic light-emitting diodes, a surface-conduction electron emitter, a carbon nanotube, and nano-crystals.

The user input unit 140 is a user interface to receive input from a user. The user input 140 receives a user's selection in association with a function or operation of the display apparatus 1. Further, the user input unit 140 receives the selection of the user to select one service among a plurality of services. The user input unit 140 may include at least one key button and be configured as an operation panel or touch panel. In addition, the user input unit 140 may be configured as a remote control, a keyboard, a mouse, etc., connected to the display apparatus 1 wirelessly or via a cable.

The first controller 150 controls all of the components described above. Control operations of the first controller will be described in detail with reference to FIGS. 4 to 6.

The second communication unit 210 of the server 2 receives the unique information about the service providing apparatus 3 from the first communication unit 110 and transmits information about the at least one service implementation means corresponding to the unique information about the service providing apparatus 3 to the first communication unit 110.

The second communication unit 210 may receive unique information and information about the at least one service implementation means corresponding to the unique information from a plurality of service providing apparatuses.

Alternatively, the second communication unit 210 of the server 2 receives information about any one service among a plurality of services from the first communication unit 110 and transmits information about at least one application corresponding to the received information about the service among the plurality of services to the first communication unit 110.

The second storage unit 220 of the server 2 stores the unique information about the service providing apparatus 3 received from the service providing apparatus 3 and information about at least one service implementation means corresponding to the unique information.

In one embodiment, the service providing apparatus 3 may transmit, to the server 2, the unique information and information about at least one service implementation means associated with a particular service provided to the display apparatus 1. The information about the service implementation means includes information about at least one application corresponding to the service provided by the service providing apparatus 3 and/or information about the UI specific to the service providing apparatus 3. The information about the application includes at least any one of information about a list of at least one application related to the particular service based on the unique information about the service providing apparatus, information about a download location of the at least one application included in the information about the list, and information about a source code of the at least one application included in the information about the list. Further, the information about the UI includes at least any one of information about a source code needed to install the UI providing unit providing UI corresponding to the service providing apparatus 3 and information about a download location of the information about the source code (e.g., URL address).

The second storage unit 220 stores unique information about a plurality of service providing apparatuses received from the service providing apparatuses 3 and information about at least one service implementation means corresponding to the individual unique information. Thus, when unique information about a service providing apparatus is received from the display apparatus 1, unique information corresponding to the received unique information is selected among the pre-stored unique information about the plurality of service providing apparatuses and pre-stored information about at least one service implementation means corresponding to the selected unique information is transmitted to the display apparatus 1 by control of the second controller 230.

Alternatively, the second storage unit 220 stores information about at least one application corresponding to a service of each kind. The information about the application includes at least one of information about a list of at least one application related to the service, information about a download location of the at least one application included in the information about the list, and information about a source code of the at least one application included in the information about the list.

The second controller 230 transmits, to the display apparatus 1, information about at least one service implementation means corresponding to information transmitted to the second communication unit 210.

Alternatively, the second controller 210 transmits, to the display apparatus 1, information about at least one application corresponding to the kind of a service transmitted to the second communication unit 210.

Figure 4:
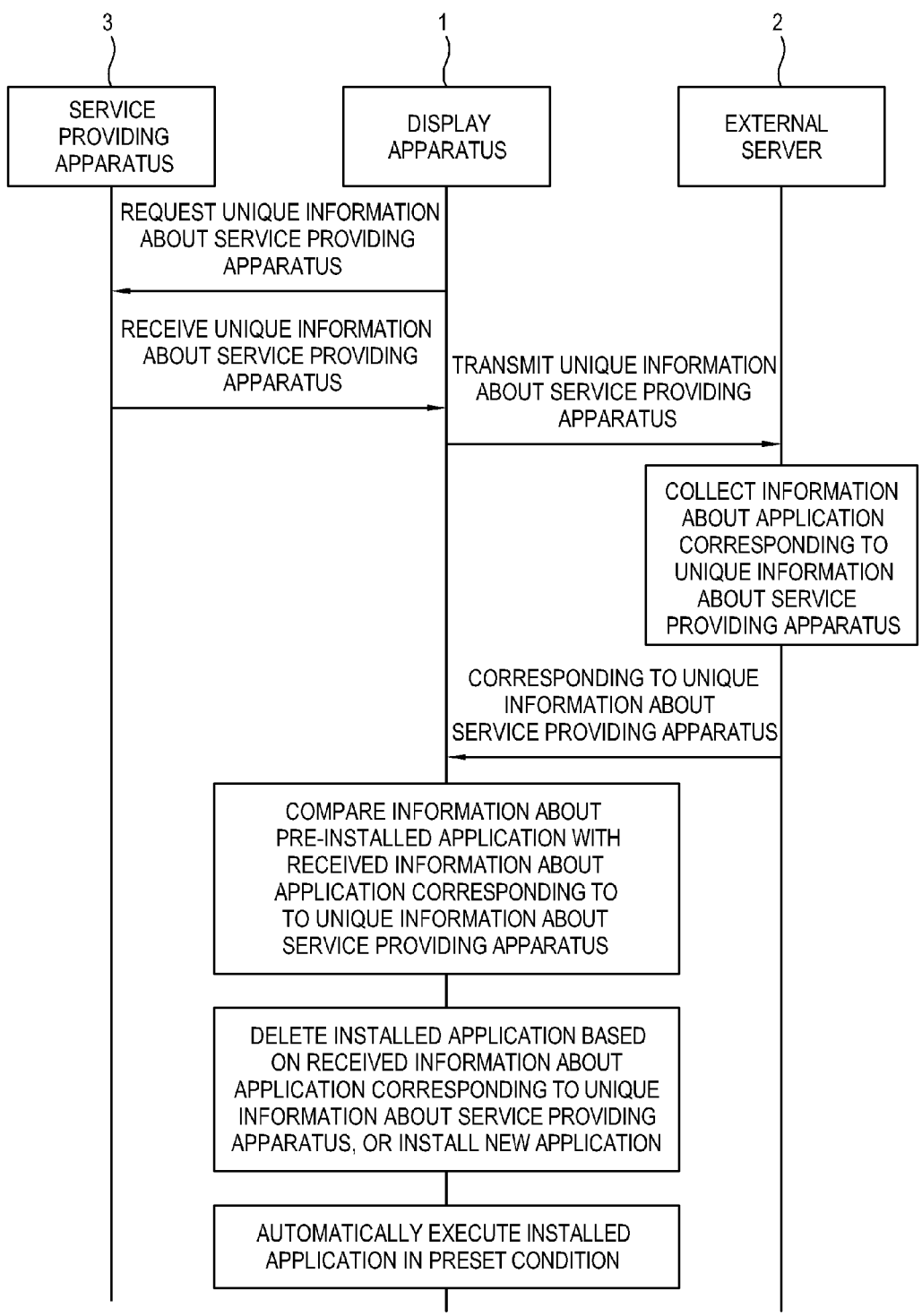
FIG. 4 is a flowchart illustrating control operations of a controller of a display apparatus according to an exemplary embodiment.

FIG. 4 is a flowchart illustrating control operations of the display apparatus 1 according to an exemplary embodiment.

The service providing apparatus 3 may transmit and register unique information about a service providing apparatus 3 and information about at least one service implement means. The information about the service implementation means may include information about an application related to a particular service and/or information about UI specific to the service providing apparatus 3. The information about the application includes at least any one of information about a list of at least one application related to the particular service or implementing the particular service, information about a download location of the at least one application included in the information about the list (e.g., URL address), and/or information about a source code. Further, the information about the UI includes at least any one of information about a source code needed to install the UI providing unit providing UI corresponding to the service providing apparatus 3 and information about a download location of the information about the source code (e.g., URL address).

The external server 2 stores unique information about each service providing apparatus received from a plurality of service providing apparatuses and information about at least one service implementation means.

FIG. 4 illustrates the scenario when information about an application corresponding to a service is received from the server 2.

The display apparatus 1 detects whether there is a service providing apparatus 3 connected to the display apparatus 1. If there is a service providing apparatus 3 connected to the display apparatus 1, the display apparatus 1 requests unique information about the service providing apparatus 3 from the service providing apparatus 3.

The service providing apparatus 3 transmits the unique information about the service providing apparatus 3 in response to the request of the display apparatus 1. Here, the unique information about the service providing apparatus 3 includes an identification number of the service providing apparatus 3 and information about a particular service.

The display apparatus 1 transmits the received unique information about the service providing apparatus 3 to the external server 2, and the external server 2 collects information about an application corresponding to the unique information about the service providing apparatus 3 and transmits the collected information to the display apparatus 1.

The display apparatus 1 may list the information about the application corresponding to the unique information about the service providing apparatus 3 received from the server 2. The information about the application may be stored in the first storage unit 120. As shown in FIG. 5, the display apparatus 1 may list and store information about at least one application needed to perform a particular service (service 1).

The display apparatus 1 compares the received information about the application corresponding to the unique information about the service providing apparatus 3 with information about pre-installed applications. The display apparatus 1 collects information about only a pre-installed application related to information about a particular service included in the unique information about the service providing apparatus 3, among the information about pre-installed applications stored in the first storage unit 120, and selects the collected information for comparison.

As a result of the comparison, if there is information about a pre-installed application different from the received information about the application corresponding to the unique information about the service providing apparatus 3, the information different from the received information about the application corresponding to the unique information about the service providing apparatus 3 is automatically deleted. If the received information about the application corresponding to the unique information about the service providing apparatus 3 is new, the display apparatus 1 downloads and installs the corresponding application based on the information about the application. Since the information about the application includes information about a download location of the application and/or information about a source code thereof, the display apparatus 1 may download or immediately install the application using the information about the application. The display apparatus 1 may update the information about the pre-installed applications of the first storage unit 120 corresponding to the automatic deletion or the automatic installation of the application.

The display apparatus 1 may execute the installed at least one application in a preset condition. Therefore, when a preset signal is received, the display apparatus 1 may automatically execute an application corresponding to the preset signal among the installed at least one application.

A service providing apparatus connected to the display apparatus 1 may be changed. For example, the display apparatus 1 may be connected to a service providing apparatus provided by a new service provider instead of a current service provider. In this case, the display apparatus 1 may receive unique information from the new service providing apparatus and receive information about at least one application corresponding to the unique information about the new service providing apparatus. The display apparatus 1 may automatically delete all applications related to the previous service providing apparatus and install an application corresponding to the new service providing apparatus.

Alternatively, if there is information about the UI corresponding to the unique information about the service providing apparatus 3 received from the display apparatus 1, the external server 2 transmits the information about the UI to the display apparatus 1. The information about the UI includes at least one of information about a source code needed to install the UI providing unit 123 providing the UI corresponding to the service providing apparatus 3 and information about a download location of the information about the source code (e.g., URL address). Accordingly, the display apparatus 1 automatically installs the UI providing unit 123 based on the information about the UI received from the server 2.

For example, when the service providing apparatus 3 is a device providing a broadcast, the UI providing unit 123 may provide the UI displaying a channel banner of the broadcast, an electronic program guide (EPG), and a channel list. The UI provided by the UI providing unit 123 may be provided in a graphic user interface (GUI) form.

There are a plurality of service providers. The service providing apparatus 3 corresponds to a service provider. Thus, the UI may have different designs, forms, configurations, kinds, etc., depending on the service provider. The display apparatus 1 just acquires unique information about a particular service providing apparatus (or a service providing apparatus provided by a particular service provider) currently connected thereto to obtain information about the UI providing UI specific to the service providing apparatus corresponding to the acquired unique information, thereby installing a UI providing unit. Accordingly, when the display apparatus 1 is connected to a service providing apparatus provided by a different service provider from a previous provider, the display apparatus 1 may provide UI specific to the new service provider to the user through the same procedure as above. Therefore, even though a service provider is changed, there is no need to change firmware installed in the display apparatus in order to provide the UI specific to a new service provider. Thus, the user's convenience is improved when there is a new service provider.

FIG. 6 illustrates that the display apparatus provides UI specific to each service provider according to an exemplary embodiment.

When a first service providing apparatus 3-1 is connected to a display apparatus 1-1, the display apparatus 1-1 transmits unique information received from the first service providing apparatus 3-1 to the external server 2, receives information about UI corresponding to the unique information, and installs a UI providing unit 123 based on the information about the UI. The UI providing unit 123 generates and displays the UI specific to the first service providing apparatus 3-1. For example, if the UI provides an EPG, when a selection of the user indicates that an EPG is input through the user input unit 140, the display apparatus 1-1 displays an EPG design 1 specific to the first service providing apparatus 3-1 as the UI provided by the UI providing unit 123. Further, when a display apparatus 1-2 is connected to a second service providing apparatus 3-2, the display apparatus 1-2 displays an EPG design 2 specific to the second service providing apparatus 3-2 as the UI provided by the UI providing unit. Further, when a display apparatus 1-3 is connected to a third service providing apparatus 3-3, the display apparatus 1-3 displays an EPG design 3 specific to the third service providing apparatus 3-3 as the UI provided by the UI providing unit.

If a service providing apparatus connected to the display apparatus 1-1 is changed from the first service providing apparatus 3-1 to the third service providing apparatus 3-3, the display apparatus 1-1 may receive unique information from the third service providing apparatus 3-3 and receive information about the UI corresponding to the third service providing apparatus 3-3 from the server 2. The display apparatus 1-1 may delete the pre-installed UI providing unit corresponding to the first service providing apparatus 3-1 and install the UI providing unit corresponding to the newly received information about the UI corresponding to the third service providing apparatus 3-3. Consequently, when the display apparatus 1-1 receives a request for display of an EPG through the user input unit 140, the display apparatus 1-1 may display the EPG design 3 specific to the third service providing apparatus 3-3.

Figure 7:
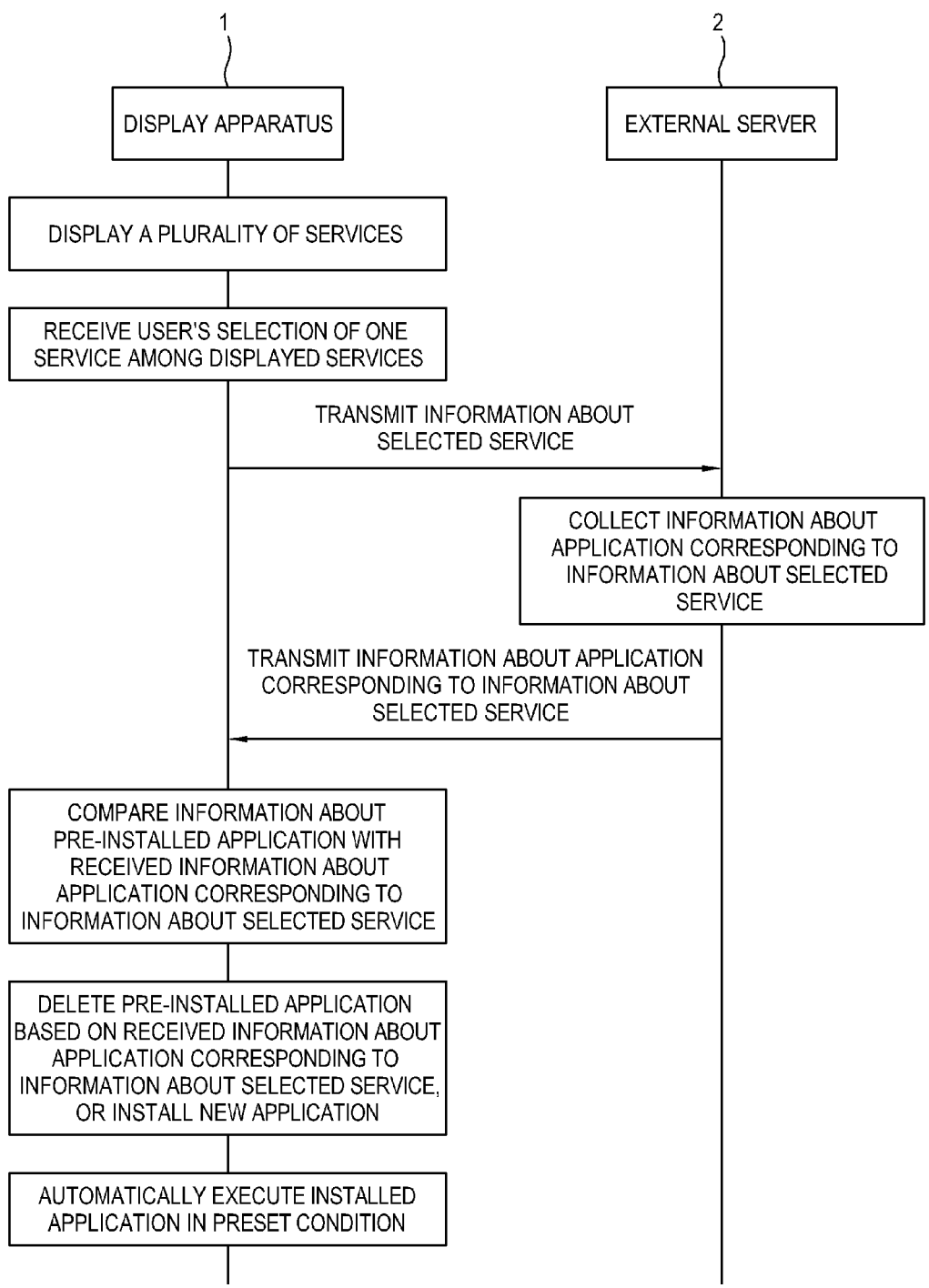
FIG. 7 is a flowchart illustrating control operations of a controller of a display apparatus according to another exemplary embodiment.

FIG. 7 is a flowchart illustrating control operations of a display apparatus 1 according to another exemplary embodiment.

Information about at least one application corresponding to each of a plurality of various services is registered in the external server 2.

The display apparatus 1 displays the plurality of services in order that a user selects a service to be automatically installed by the display apparatus 1 among the services, and the display apparatus 1 receives input of a user's selection of one service among the plurality of services. These services may be displayed in a GUI form. The services refers to services to be provided to a user using an application executable in the display apparatus 1, i.e., a social networking service (SNS), an EPG providing function, a display function related to a broadcast, a channel display function, etc. However, the application executable in the display apparatus is not limited. When selection of one of the services by the user is input, the display apparatus 1 transmits information about the service selected by the user to the server 2. The server 2 collects information about an application corresponding to the information about the service selected by the user and transmits the collected information to the display apparatus 1. If the user selects an SNS, the display apparatus 1 transmits information about the SNS to the server 2, and the server 2 collects information about at least one application related to the SNS from the second storage unit 220 and transmits the collected information to the display apparatus 1.

The display apparatus 1 compares received information about an application corresponding to the unique information about the service providing apparatus 3 with information about pre-installed applications. As a result of the comparison, if there is information about a pre-installed application different from the received information about the application corresponding to the unique information about the service providing apparatus 3, the information different from the received information about the application corresponding to the unique information about the service providing apparatus 3 is automatically deleted. If the received information about the application corresponding to the unique information about the service providing apparatus 3 is new, the display apparatus 1 downloads and installs the corresponding application based on the information about the application. The display apparatus 1 may execute the installed at least one application in a preset condition. Automatic deletion or installation and execution of the application are described above. Thus, descriptions are only briefly mentioned.

An example of an automatic execution of an application of the display apparatus 1 is described.

In one embodiment, the display apparatus 1 may automatically execute an application installed in the display apparatus 1 corresponding to a power on/off signal of the display apparatus 1.

In another embodiment, it is assumed that an application installed in the display apparatus 1 through the process of FIG. 4 or FIG. 6 has a function of performing a different image processing process depending on an external image source. If the display apparatus 1, which may receive an external image source, i.e., HDMI 1, HDMI 2, etc., detects reception of an external image of HDMI 1, the application is automatically executed corresponding to a signal of the image reception. Thus, an image processing process is performed corresponding to the HDMI 1.

Alternatively, it is assumed that the service providing apparatus 3 connected to the display apparatus 1 is configured as a set-top box (STB). If there is an exclusive remote control for the display apparatus 1 and an exclusive remote control for the STB, a user will use both the remote controls to control the two apparatus. Using the two remote controls is inconvenient for the user. Accordingly, the display apparatus 1 installs an application through the process of FIG. 4. The installed application is configured to provide a particular service of the service providing apparatus 3 that enables a function of controlling the STB (i.e., the service providing apparatus) using one exclusive remote control for the display apparatus 1. When the display apparatus 1 receives a channel up/down signal from the one exclusive remote control for the display apparatus 1, the application is automatically executed. The automatically executed application changes the received channel up/down signal into a signal format recognizable by the STB and transmits the changed channel up/down signal to the STB. Thus, the STB performs a channel up/down function.

As described above, it is possible to automatically execute an application corresponding to a preset signal depending on a function or service performed by the application. The embodiments are provided only for illustrative examples, and may be modified variously depending on functions of applications.

According to exemplary embodiments, the display apparatus 1 may automatically install or delete an application specific to a particular service and may automatically execute an installed application in a preset condition. Thus, the user convenience will be improved by automatically installing or deleting an application specific to a particular service and automatically executing an installed application in a preset condition.

When the display apparatus 1 receives information about the UI corresponding to the service providing apparatus 3 from the server 2 and installs the UI providing unit 123, if input of a key button of the user input unit 140 occurs, the controller 150 of the display apparatus 1 may execute the UI providing unit 123 to generate and display the UI specific to the service providing apparatus 3. For example, when a power-on key is input through the user input unit 140, the display apparatus 1 may control the UI providing unit 123 to generate and display the UI specific to the currently connected service providing apparatus 3.

Although a few exemplary embodiments have been shown and described, it will be appreciated by those skilled in the art that changes may be made in these exemplary embodiments without departing from the principles and spirit of the embodiments, the scope of which is defined in the appended claims and their equivalents.

What is claimed is:

1. A display apparatus comprising:
a display;
a first communicator which communicates with a service providing apparatus providing at least one service to a user of the display apparatus;
a second communicator which communicates with an external server storing at least one application; and
a controller which is configured to:
control the display to display an image based on an image signal that is received from the service providing apparatus via the first communicator,
upon connection of the service providing apparatus to the display apparatus, obtain identification information on the service providing apparatus via the first communicator from the service providing apparatus, and
transmit the identification information on the service providing apparatus to the external server via the second communicator, in response to transmitting the identification information on the service providing apparatus to the external server, receive the at least one application corresponding to the transmitted identification information on the service providing apparatus from the external server via the second communicator, and install the at least one application received via the second communicator,
wherein the identification information on the service providing apparatus and the at least one application corresponding to the identification information on the service providing apparatus are registered in the external server in advance before the identification information on the service providing apparatus is transmitted to the external server,
wherein at least one of the first communicator, the second communicator and the controller is implemented by using a hardware processor, and
wherein the at least one application comprises a user interface (UI) specific to the service providing apparatus, and wherein the controller receives information about the UI from the external server and in response to a user input, displays the UI based on the received information about the UI.

2. The display apparatus of claim 1, wherein the at least one application further comprises an application implementing a corresponding service, and the controller receives the at least one application from the external server and installs and executes the at least one application.

3. The display apparatus of claim 2, wherein the controller executes an application corresponding to a preset signal among the installed at least one application when the preset signal is received.

4. The display apparatus of claim 2, further comprising a storage unit storing information about an application that is pre-installed in the display apparatus.

5. The display apparatus of claim 4, wherein the controller compares information about the received at least one application corresponding to the identification information on the service providing apparatus with the information about the stored pre-installed application, and then deletes a pre-installed application which is not included in the information about the received at least one application corresponding to the identification information on the service providing apparatus.

6. The display apparatus of claim 5, wherein the controller updates the information about the application pre-installed in the storage unit corresponding to the installation or the deletion of the application.

7. The display apparatus of claim 2, wherein the at least one application comprises at least one of information about a list of the at least one application related to a particular service based on the identification information on the service providing apparatus, information about a download location of the at least one application included in the information about the list, and information about a source code of the at least one application included in the information about the list.

8. The display apparatus of claim 1, wherein the identification information on the service providing apparatus comprises at least one of an identification number of the service providing apparatus and information about a particular service provided by the service providing apparatus.

9. The display apparatus of claim 1, wherein the information about the UI comprises at least one of information about a source code needed to generate the UI and information about a download location of the information about a source code.

10. The display apparatus of claim 1, wherein the first communicator communicates with the service providing apparatus providing the at least one service, so that the first communicator requests the identification information on the service providing apparatus to the service providing apparatus and receives the identification information on the service providing apparatus from the service providing apparatus, and
wherein the second communicator communicates with the external server storing the at least one application, so that the second communicator transmits the identification information on the service providing apparatus received from the service providing apparatus via the first communicator to the external server and receives the at least one application corresponding to the transmitted identification information on the service providing apparatus from the external server.

11. An implementation method by a display apparatus comprising:
displaying an image based on an image signal that is received from a service providing apparatus via a first communicator, the service providing apparatus providing at least one service to a user of the display apparatus;
upon connection of the service providing apparatus to the display apparatus, obtaining identification information on the service providing apparatus via the first communicator from the service providing apparatus, and transmitting the identification information on the service providing apparatus to an external server via a second communicator;
in response to transmitting the identification information on the service providing apparatus to the external server, receiving at least one application corresponding to the transmitted identification information on the service providing apparatus from the external server via the second communicator; and installing the at least one application received via the second communicator,
wherein the identification information on the service providing apparatus and the at least one application corresponding to the identification information on the service providing apparatus are registered in the external server in advance before the identification information on the service providing apparatus is transmitted to the external server, and
wherein the at least one application comprises a user interface (UI) specific to the service providing apparatus, and
wherein the implementation method further comprises receiving information about the UI from the external server and in response to a user input, displaying the UI based on the received information about the UI.

12. The implementation method of claim 11, wherein the at least one application further comprises the application implementing a corresponding service,
further comprising receiving the at least one application corresponding to the identification information on the service providing apparatus from the external server, and installing and executing the at least one application.

13. The implementation method of claim 12, wherein the executing the at least one application executes an application corresponding to a preset signal among the installed at least one application when the preset signal is received.

14. The implementation method of claim 12, further comprising storing, in a storage unit, information about an application that is pre-installed in the display apparatus.

15. The implementation method of claim 14, wherein the installing the application further comprises comparing information about the received at least one application corresponding to the identification information on the service providing apparatus with the information about the stored pre-installed application, and then deleting a pre-installed application which is not included in the information about the received at least one application corresponding to the identification information on the service providing apparatus.

16. The implementation method of claim 15, further comprising updating the information about the application pre-installed in the storage unit corresponding to the installation or the deletion of the application.

17. The implementation method of claim 12, wherein the at least one application comprises at least one of information about a list of the at least one application related to a particular service based on the identification information on the service providing apparatus, information about a download location of the at least one application included in the information about the list, and information about a source code of the at least one application included in the information about the list.

18. The implementation method of claim 11, wherein the identification information on the service providing apparatus comprises at least one of an identification number of the service providing apparatus and information about a particular service provided by the service providing apparatus.

19. The implementation method of claim 11, wherein the information about the UI comprises at least one of information about a source code needed to generate the UI and information about a download location of the information about a source code.

20. A display apparatus comprising:
a display;
a first communicator which communicates with a service providing apparatus providing at least one service to a user of the display apparatus;
a second communicator which communicates with an external server storing information about at least one application; and
a controller which is configured to:
control the display to display an image based on an image signal that is received from the service providing apparatus via the first communicator,
upon connection of the service providing apparatus to the display apparatus, obtain identification information on the service providing apparatus via the first communicator from the service providing apparatus, transmit the identification information on the service providing apparatus to the external server, and in response to transmitting the identification information on the service providing apparatus to the external server, receive information about at least one application corresponding to the transmitted identification information on the service providing apparatus from the external server via the second communicator, and install the at least one application based on the information about the at least one application received via the second communicator, wherein the identification information on the service providing apparatus and the information about the at least one application corresponding to the identification information on the service providing apparatus are registered in the service providing apparatus in advance before the identification information on the service providing apparatus is transmitted to the external server, and wherein at least one of the first communicator, the second communicator and the controller is implemented by using a hardware processor, and wherein the at least one application comprises a user interface (UI) specific to the service providing apparatus, and wherein the controller receives information about the UI from the external server and in response to a user input, displays the UI based on the received information about the UI.

21. The display apparatus of claim 20, further comprising a user input unit through which a user inputs a selection of the one service among the plurality of services, wherein the controller transmits information about the one service selected by the user to the external server.

22. The display apparatus of claim 21, wherein the controller executes an application corresponding to a preset signal among the installed at least one application when the preset signal is received.

23. The display apparatus of claim 20, further comprising a storage unit which stores information about an application that is pre-installed in the display apparatus.

24. The display apparatus of claim 23, wherein the controller compares the received information about the at least one application corresponding to identification information on the service providing apparatus with the information about the stored pre-installed application, and then deletes a pre-installed application which is not included in the received information about the at least one application corresponding to the identification information on the service providing apparatus.

25. The display apparatus of claim 24, wherein the controller updates the information about the application pre-installed in the storage unit corresponding to the installation or the deletion of the application.

26. The display apparatus of claim 20, wherein the information about the at least one application comprises at least one of information about a list of at least one application related to the one service based on information about the one service selected by a user, information about a download location of the at least one application included in the information about the list, and information about a source code of the at least one application included in the information about the list.

27. An implementation method by a display apparatus comprising:

displaying an image based on an image signal received from a service providing apparatus via a first communicator, the service providing apparatus providing at least one service to a user of the display apparatus;

upon connection of the service providing apparatus to the display apparatus, obtaining identification information on the service providing apparatus via the first communicator from the service providing apparatus, transmitting the identification information on the service providing apparatus to an external server via a second communicator;

in response to transmitting the identification information on the service providing apparatus to the external server, receiving information about at least one application corresponding to the transmitted identification information on the service providing apparatus from the external server via the second communicator; and installing the at least one application based on the information about the at least one application received via the second communicator, wherein the identification information on the service providing apparatus and the information about the at least one application corresponding to the identification information on the service providing apparatus are registered in the external server in advance before the identification information on the service providing apparatus is transmitted to the external server, and wherein the at least one application comprises a user interface (UI) specific to the service providing apparatus, and wherein the implementation method further comprises receiving information about the UI from the external server and in response to a user input, displaying the UI based on the received information about the UI.

28. The implementation method of claim 27, further comprising:

receiving a user selection of the one service among the plurality of services; and transmitting information about the one service selected by the user to the external server.

29. The implementation method of claim 28, further comprising executing an application corresponding to a preset signal among the installed at least one application when the preset signal is received.

30. The implementation method of claim 27, further comprising storing, in a storage unit, information about an application that is pre-installed in the display apparatus.

31. The implementation method of claim 30, wherein the installing the application further comprises comparing the received information about the at least one application corresponding to identification information on the service providing apparatus with the information about the stored pre-installed application, and then deleting a pre-installed application which is not included in the received information about the at least one application corresponding to the identification information on the service providing apparatus.

32. The implementation method of claim 31, further comprising updating the information about the application pre-installed in the storage unit corresponding to the installation or the deletion of the application.

33. The implementation method of claim 27, wherein the information about the at least one application comprises at least one of information about a list of at least one application related to the one service based on information about the one service selected by a user, information about a download location of the at least one application included in the information about the list, and information about a source code of the at least one application included in the information about the list.

34. A display apparatus system comprising:
a first communicator of a display apparatus which communicates with a service providing apparatus, the service providing apparatus providing at least one service to a user of the display apparatus, and an external storage, wherein the first communicator upon connection of the service providing apparatus to the display apparatus, receives identification information on the service providing apparatus from the service providing apparatus and transmits the identification information on the service providing apparatus to the external storage;
a second communicator of the external storage which receives the identification information on the service providing apparatus from the display apparatus via the first communicator and transmits at least one application corresponding to the identification information on the service providing apparatus to the display apparatus via the first communicator;
a first controller which receives the at least one application corresponding to the identification information on the service providing apparatus from the external storage via the first communicator, installs the at least one application received via the first communicator, and executes the installed at least one application in a preset condition when the identification information on the service providing apparatus is received through the first communicator; and
a second controller which receives the identification information on the service providing apparatus from the display apparatus via the second communicator and transmits to the display apparatus the at least one application corresponding to the identification information on the service providing apparatus via the second communicator,
wherein the identification information on the service providing apparatus and the at least one application corresponding to the identification information on the service providing apparatus are registered in the external server in advance before the identification information on the service providing apparatus is transmitted to the external server, and
wherein at least one of the first communicator, the second communicator, the first controller, and the second controller is implemented by using a hardware processor, and
wherein the at least one application comprises a user interface (UI) specific to the service providing apparatus, and wherein the first controller receives information about the UI from the external server and in response to a user input, displays the UI based on the received information about the UI.

* * * * *